(12) United States Patent
McAlister

(10) Patent No.: US 9,283,710 B2
(45) Date of Patent: Mar. 15, 2016

(54) CATALYTICALLY IGNITED CERAMIC INFRARED EMITTER FOR FUSION WELDING PIPE JOINTS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 18 days.

(21) Appl. No.: 14/067,842

(22) Filed: Oct. 30, 2013

(65) Prior Publication Data

US 2014/0262009 A1    Sep. 18, 2014

Related U.S. Application Data

(62) Division of application No. 13/798,821, filed on Mar. 13, 2013, now Pat. No. 8,596,320.

(51) Int. Cl.
*B29C 65/14* (2006.01)
*B29C 65/00* (2006.01)
*C03B 23/207* (2006.01)

(52) U.S. Cl.
CPC .......... *B29C 65/1412* (2013.01); *B29C 66/522* (2013.01); *B29C 66/52241* (2013.01); *B29C 66/80* (2013.01); *B29C 66/8122* (2013.01); *B29C 66/81241* (2013.01); *B29C 66/8432* (2013.01); *C03B 23/207* (2013.01); *B29C 65/1477* (2013.01); *B29C 66/73921* (2013.01)

(58) Field of Classification Search
CPC .... B29C 65/1412; B29C 66/51; B29C 66/52; B29C 66/522; B29C 66/80; B29C 66/8432; B29C 66/52241; C03B 23/207
See application file for complete search history.

(56) References Cited

U.S. PATENT DOCUMENTS

| | | | |
|---|---|---|---|
| 3,867,311 A | | 2/1975 | Johnson |
| 3,977,836 A | * | 8/1976 | Matsuda et al. ............. 436/113 |
| 4,714,513 A | | 12/1987 | McAlister |
| 4,929,293 A | * | 5/1990 | Osgar ........................ 156/158 |

(Continued)

FOREIGN PATENT DOCUMENTS

WO    0049339 A1    8/2000

OTHER PUBLICATIONS

"The Future of Geothermal Energy: Impact of Enhanced Geothermal Systems (EGS) on the United States in the 21st Century." Idaho National Laboratory. ID Falls, ID. 2006. Chapter 7, pp. 1-31.

(Continued)

*Primary Examiner* — Daniel McNally
(74) *Attorney, Agent, or Firm* — Perkins Coie LLP

(57) ABSTRACT

Disclosed herein is an infrared emitter welder for fusion welding pipe joints. In one representative embodiment, the welder comprises a fuel tank adapted to contain a fuel under pressure and a heating element in fluid communication with the fuel tank. The heating element includes a pair of porous ceramic plates, each having opposing first and second surfaces, wherein the first surfaces of the ceramic plates are joined together, and wherein at least one of the first surfaces includes fuel distribution channels formed therein. A catalytic material, such as platinum, is disposed on at least one of the second surfaces and is operative to ignite the fuel as it reaches the second surface. A supply conduit interconnects the fuel tank and heating element.

8 Claims, 2 Drawing Sheets

(56) References Cited

U.S. PATENT DOCUMENTS

| | | | |
|---|---|---|---|
| 8,596,320 B1 | 12/2013 | McAlister | |
| 2007/0169461 A1* | 7/2007 | Koerner | 60/39.12 |
| 2008/0090188 A1 | 4/2008 | Pisklak et al. | |
| 2012/0090765 A1* | 4/2012 | Tailor et al. | 156/86 |

OTHER PUBLICATIONS

Hummel, Holmes. "Technology & Policy Implications in Climate Policy Scenario Analysis: Two Decompositions." Presentation. 2010. pp. 1-52.

"Emissions of Greenhouse Gases in the United States 2008." U.S. Energy Information Administration. Dec. 2009. pp. 1-68.

"2010 International Energy Outlook." U.S. Energy Information Administration. May 25, 2010. pp. 1-8.

Auffhammer et al. "Forecasting the Path of China's CO2 Emissions Using Province-level Information." Journal of Environmental Economics and Management. 2008. pp. 1-19.

International Searching Authority, International Search Report and Written Opinion for International Application No. PCT/US2014/025939, mailed Jul. 28, 2014, 11 pages.

* cited by examiner

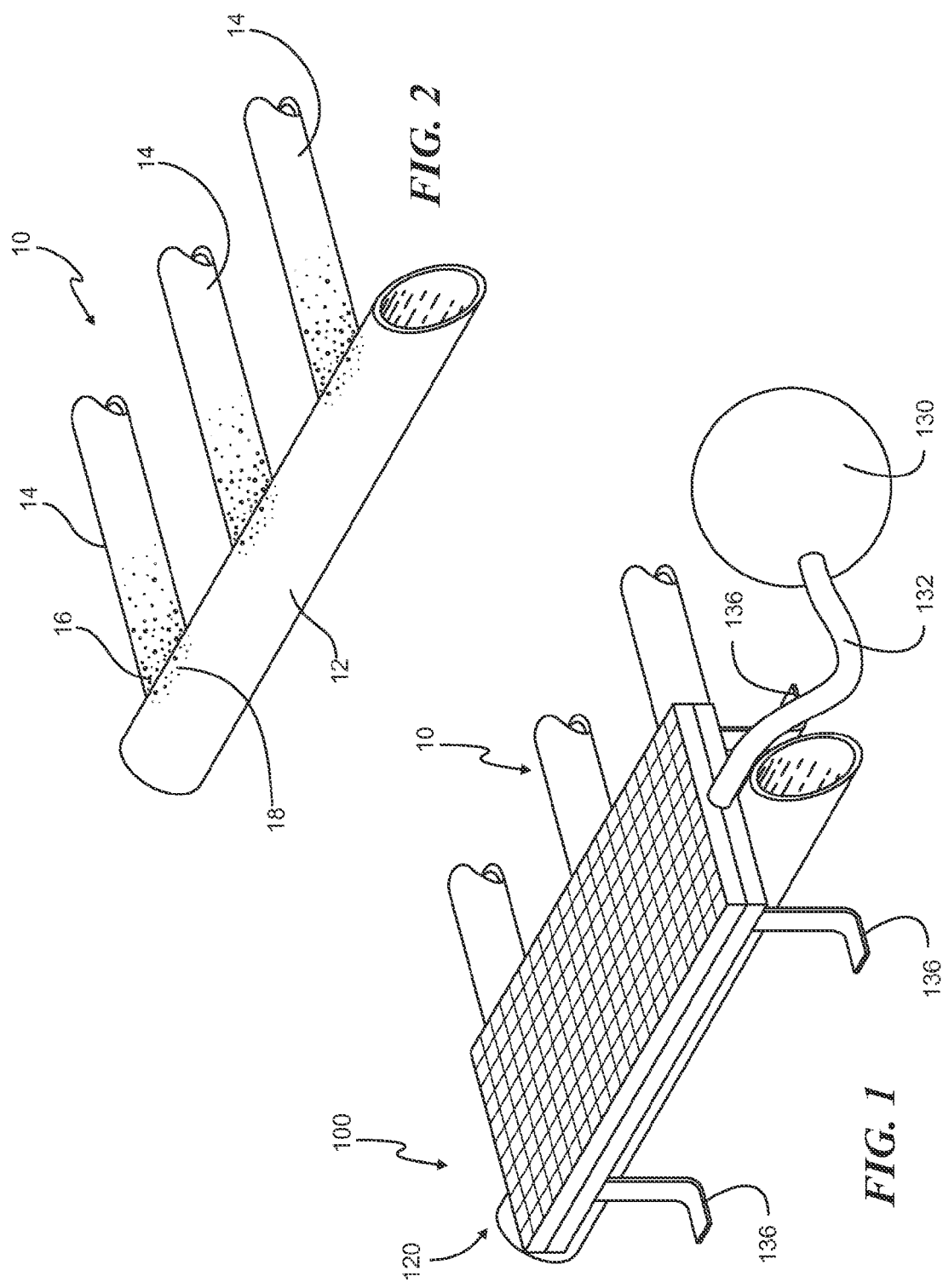

CATALYTICALLY IGNITED CERAMIC INFRARED EMITTER FOR FUSION WELDING PIPE JOINTS

CROSS-REFERENCE TO RELATED APPLICATION(S)

The present application is a divisional of U.S. patent application Ser. No. 13/798,821, filed on Mar. 13, 2013, which application is incorporated herein by reference. To the extent the foregoing application and/or other materials incorporated herein by reference conflict with the present disclosure, the present disclosure controls.

BACKGROUND

Connecting glass and/or plastic pipes together to form various pipe assemblies, such as solar panels and associated manifolding, is often achieved with glue, solvent welding, or fusion welding processes. Typical heating devices for fusion welding glass and plastic is often application specific and requires extensive preparation of the tubes prior to glue, solvent, or fusion welding. For example, the tubes must be properly mitered or cut to match surfaces. Such surfaces are typically curved requiring a great deal of skill to properly match the joints for welding. Accordingly there is a need for a versatile fusion welder that is adaptable to different applications and has few parts and requires little preparation of the tubes to be joined.

BRIEF DESCRIPTION OF THE DRAWINGS

Non-limiting and non-exhaustive embodiments of the devices, systems, and methods, including the preferred embodiment, are described with reference to the following figures, wherein like reference numerals refer to like parts throughout the various views unless otherwise specified.

FIG. 1 is a schematic perspective view of a catalytically ignited ceramic infrared emitter according to a representative embodiment;

FIG. 2 is a perspective view of the pipe assembly shown in FIG. 1; and

DETAILED DESCRIPTION

Figure 3:
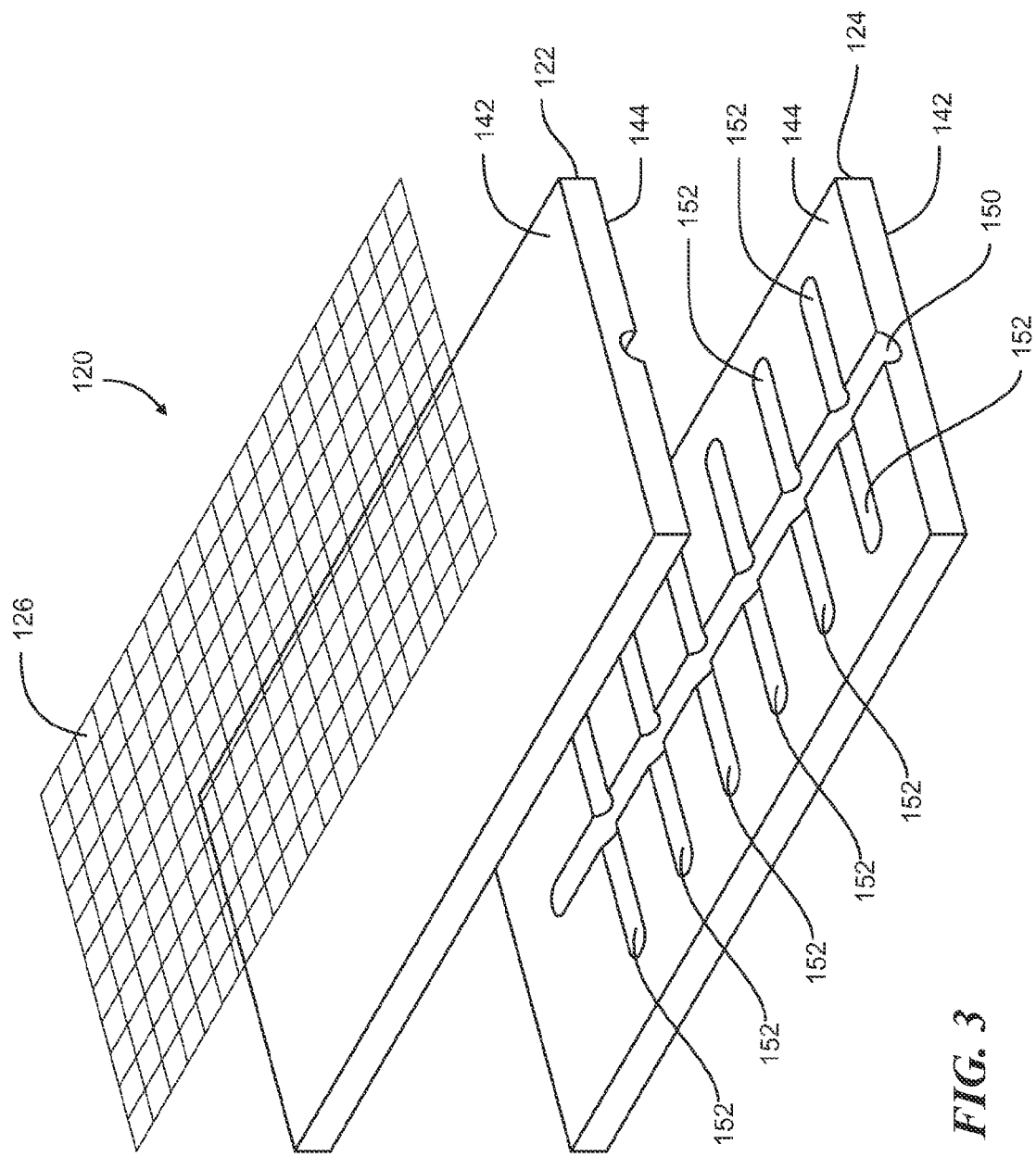
FIG. 3 is an exploded perspective view of the heater element shown in FIG. 1.

Disclosed herein is a radiant heat transfer system such as an infrared emitter welder for fusion welding pipe joints. In one representative embodiment, the welder comprises a fuel tank adapted to contain a fuel under pressure and a heating element in fluid communication with the fuel tank. The heating element includes a pair of porous ceramic plates, each having opposing first and second surfaces, wherein the first surfaces of the ceramic plates are joined together, and wherein at least one of the first surfaces includes fuel distribution channels formed therein. A catalytic material, such as platinum, and/or various ceramics, intermetallics, or cermets is disposed on at least one of the second surfaces and is operative to ignite the fuel as it reaches the second surface. In some embodiments, the fuel combustion catalyst becomes more effective after being heated. Startup may utilize an electrical resistance or inductor heater and/or a spark, magnetohydrodynamic ionization thrusting or corona ignition of fuel to provide combustion of fuel and after the catalyst is heated it becomes a component of a surface combustion and radiation system that is more or less flameless. A supply conduit interconnects the fuel tank and heating element.

In one aspect of the disclosed technology, the ceramic plates comprise aluminum oxide. In other aspects, the ceramic plates comprise zirconia, spinel, silicon carbide, silicon nitride, and/or silicon oxide. In some embodiments, the fuel tank contains a fuel comprising hydrogen. The fuel may further comprise argon. In other embodiments, the fuel tank contains a fuel comprising ammonia. In other aspects of the disclosed technology, both of the first surfaces include fuel distribution channels and both of the second surfaces include platinum and/or various ceramics intermetallics or cermets catalyst material.

Also disclosed herein are methods for fusion welding pipe joints. In an embodiment, the method comprises positioning a porous ceramic element proximate a pipe joint, distributing fuel through the porous ceramic element, and catalytically igniting the fuel with a catalytic material. In certain aspects of the disclosed technology, the pipes comprise transparent glass, such as borosilicate glass. In other aspects, the glass comprises a tint operative to increase heat generation efficiency upon receipt of radiant energy from the ceramic element. For example, the tint may comprise carbon, a transition metal carbide, silicon carbide, aluminum nitride, chromium oxide, copper, or the like.

Specific details of several embodiments of the technology are described below with reference to FIGS. 1-3. Other details describing well-known structures and systems often associated with gaseous fuel powered heaters, such as fuel tanks, regulators, spark igniters, safety devices, and the like, have not been set forth in the following disclosure to avoid unnecessarily obscuring the description of the various embodiments of the technology. Many of the details, dimensions, angles, steps, and other features shown in the figures are merely illustrative of particular embodiments of the technology. Accordingly, other embodiments can have other details, dimensions, angles, steps, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-3.

FIG. 1 illustrates a radiant heater such as an infrared emitter welder according to a representative embodiment which is shown in position to fusion weld a pipe assembly 10. A fuel tank 130 supplies fuel via supply conduit 132 to a heating element 120. In this embodiment, emitter welder 100 is supported above pipe assembly 10 by a set of legs or stanchions 136. While emitter welder 100 is shown in the figures to have a particular configuration for the given application of welding header assembly 10, other configurations and custom-shaped heater elements may be used for applications as necessary. In addition, existing pipe welding heater assembles may be modified to incorporate a catalytically ignited ceramic infrared emitter. One such apparatus for fusion welding plastic pipe joints that may be modified according to the disclosed technology is described in U.S. Pat. No. 4,714,513, issued Dec. 22, 1987, the disclosure of which is incorporated herein by reference in its entirety. Furthermore, while the pipe assembly 10 is shown in a particular configuration, other welded joints may be joined with the technology disclosed herein.

FIG. 2 illustrates the construction of pipe assembly 10 which is an example of one representative application where emitter welder 100 may be used. In this embodiment, pipe assembly 10 is a manifold with a header tube 12 and a plurality of transversely extending feed tubes 14 that intersect the header tube 12. In order to further enhance the welding process, the pipes to be joined such as pipes 12 and 14 shown in FIG. 2, may be doped or tinted with various materials which are operative to increase heat generative efficiency upon receipt of radiant energy from the ceramic elements. For example, as described more fully below, the areas to be welded 16, 18 may be tinted with carbon, silicon carbide, aluminum nitride, chromium oxide, or copper, for example.

With reference to FIG. 3, the emitter welder 100 includes a heating element 120 which includes a pair of porous ceramic plates 122 and 124 which are held or joined together to create the heating element. Each ceramic plate 122 and 124 has a first surface 144 and second surfaces 142. The first surfaces 144 of the ceramic plates 122 and 124 are joined together and at least one of the first surfaces 144 includes fuel distribution channels formed therein. In this embodiment, both first surfaces include fuel distribution channels. For example, ceramic plate 124 includes a central longitudinal distribution channel 150 with a plurality of transversely extending channels 152. Thus, fuel is distributed along the length of the ceramic plates whereby fuel may flow to the second surface of the ceramic plate via the pores in the ceramic. Other suitable distribution channel patterns may be used. The ceramic plates may be comprised of any suitable porous ceramic material, such as aluminum oxide, silicone oxide, or the like. The wave length of the radiation, such as infrared radiation, emitted from the radiant welder 100 may be tuned by variations in the composition of the ceramic material and/or by controlling the temperature of radiating zones by the heat production rate as a function of the rate of fuel and/or oxidant delivery. The radiation such as the infrared wave length may be tuned based on the material to be welded such as whether it is glass or plastic, for example, as well as any tint or colorant added to the glass or plastic.

A catalytic material 126 is disposed on at least one of the second surfaces 142 and is operative to ignite the fuel as it reaches the second surface. The heating element 120 may include catalytic material 126 on one or both of the second surfaces. For example, in FIG. 1 heater element 120 has catalytic material 126 on both the upper and lower surfaces (e.g., both second surfaces 142). The catalyst material may be any suitable catalyst such as a suitable ceramic, intermetallic, cermet, and/or a selection from the platinum metal group. Various catalytically ignited fuels may be used, such as hydrogen. Furthermore, the fuel may be mixed with secondary elements to enhance infrared radiation production. For example, Argon and/or a chemical donor of sodium, potassium or carbon may be added to the hydrogen fuel in order to enhance plasma and/or production of radiation of the desired frequency band at the surface of the catalytic material 126. In other embodiments, ammonia may be used as a fuel that also produces nitrogen during the process of combustion which is a good cover gas for welding.

The glass or plastic to be welded may be tinted with colorants that reduce radiant heat penetration and improve energy conversion efficiency for fusion welding. Various glass compositions such as low thermal expansion borosilicate and soda lime glass may be transparent. The tint of the glass or plastic can be tuned to work efficiently with the selected ceramic composition. For example, the addition of iron and/or chromium oxides produce green to blue tints, depending upon the iron oxidation and colorant density, to increase heat generation efficiency in tinted regions upon receipt of radiant energy.

Other suitable colorants include sulfur, carbon and iron salts that form iron polysulfides and produce amber glass ranging from yellowish to translucent black. In applications with borosilicate glass, formulas that are richer in boron, sulfur imparts a blue color region. Yellow tints can be produced by additions of calcium. Soda lime glass and other compositions can be colored with manganese to produce color regions ranging from amethyst to purple. Nickel and/or manganese dioxide produces darker regions to improve welding efficiency in smaller zones of fusion. Copper oxide produces turquoise colored weld zones. Chromium can produce dark green weld zones at relatively lower concentrations. Titanium tints may be yellow to brown depending upon the chemistry of the host glass and the concentration of other tint that may be present. In addition to improving fusion welding efficiency, such colored regions have the added benefit of providing for discriminating quality control inspection. Factors such as uniformity, crazing and micro-crack detection, residual stress and other indicators are more readily observed with tinted materials.

Methods for fusion welding a pipe joint are also disclosed. The methods may include any procedural step inherent in the structures and systems described herein. In a representative embodiment, the method comprises positioning a porous ceramic element proximate a pipe joint; distributing fuel through the porous ceramic element; and catalytically igniting the fuel with a catalytic material, such that the ceramic element emits energy such as infrared radiation. In certain aspects of the disclosed technology, the pipes comprise transparent glass, such as borosilicate glass. In other aspects, the glass comprises a tint operative to increase heat generation efficiency upon receipt of radiant energy from the ceramic element. For example, the tint may comprise carbon, iron, a transition metal carbide or nitride, chromium oxide, copper, or the like.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. The following examples provide additional embodiments of the present technology.

EXAMPLES

1. An infrared emitter welder for fusion welding pipe joints, comprising:
   a fuel tank adapted to contain a fuel under pressure;
   a heating element in fluid communication with the fuel tank and including:
      a pair of porous ceramic plates, each having opposing first and second surfaces, wherein the first surfaces of the ceramic plates are joined together, and wherein at least one of the first surfaces includes fuel distribution channels formed therein; and
      a catalytic material disposed on at least one of the second surfaces and operative to ignite the fuel as it reaches the at least one of the second surfaces.

2. The system according to example 1, further comprising a supply conduit interconnecting the fuel tank and heating element.

3. The system according to example 1, wherein the ceramic plates comprise aluminum oxide.

4. The system according to example 1, wherein the ceramic plates comprise silicon oxide.

5. The system according to example 1, wherein the fuel tank contains a fuel comprising hydrogen.

6. The system according to example 5, wherein the fuel further comprises argon.

7. The system according to example 1, wherein the fuel tank contains a fuel comprising ammonia.

8. The system according to example 1, wherein the catalytic material is platinum.

9. An infrared emitter welder for fusion welding pipe joints, comprising:
a fuel tank containing a hydrogen-argon mixture;
a heating element in fluid communication with the fuel tank and including:
a pair of porous aluminum-oxide ceramic plates, each having opposing first and second surfaces, wherein the first surfaces of the ceramic plates are joined together, and wherein at least one of the first surfaces includes fuel distribution channels formed therein; and
a platinum catalyst material disposed on at least one of the second surfaces and operative to ignite the hydrogen-argon mixture as it reaches the at least one of the second surfaces; and
a supply conduit interconnecting the fuel tank and heating element.

10. The system according to example 9, wherein both of the first surfaces include fuel distribution channels.

11. The system according to example 9, wherein both of the second surfaces include platinum catalyst material.

12. A method of fusion welding a pipe joint, the method comprising:
positioning a porous ceramic element proximate a pipe joint;
distributing fuel through the porous ceramic element; and
catalytically igniting the fuel with a catalytic material.

13. The method of example 12, wherein the fuel comprises hydrogen.

14. The method of example 13, wherein the fuel further comprises argon.

15. The method of example 12, wherein the fuel comprises ammonia.

16. The method of example 12, wherein the pipes comprise transparent glass.

17. The method of example 16, wherein the glass is borosilicate.

18. The method of example 16, wherein the glass comprises a tint operative to increase heat generation efficiency upon receipt of radiant energy from the ceramic element.

19. The method of example 18, wherein the tint comprises chromium oxide.

20. The method of example 18, wherein the tint comprises copper.

I claim:

1. A method of fusion welding a pipe joint, the method comprising:
positioning a porous ceramic element proximate a pipe joint;
distributing fuel through the porous ceramic element; and
catalytically igniting the fuel with a catalytic material,
wherein the pipes comprise transparent glass.

2. The method of claim 1, wherein the glass comprises a tint operative to increase heat generation efficiency upon receipt of radiant energy from the ceramic element.

3. The method of claim 2, wherein the tint comprises chromium oxide.

4. The method of claim 2, wherein the tint comprises copper.

5. The method of claim 1, wherein the fuel comprises hydrogen.

6. The method of claim 5, wherein the fuel further comprises argon.

7. The method of claim 1, wherein the fuel comprises ammonia.

8. The method of claim 1, wherein the glass is borosilicate.

* * * * *